(12) United States Patent
Kimura

(10) Patent No.: US 8,393,883 B2
(45) Date of Patent: *Mar. 12, 2013

(54) EJECTOR DEVICE OF INJECTION MOLDING MACHINE

(75) Inventor: Seiji Kimura, Hyogo (JP)

(73) Assignee: Pascal Engineering, Hyogo (JP)

( * ) Notice: Subject to any disclaimer, the term of this patent is extended or adjusted under 35 U.S.C. 154(b) by 355 days.

This patent is subject to a terminal disclaimer.

(21) Appl. No.: 12/803,217

(22) Filed: Jun. 22, 2010

(65) Prior Publication Data

US 2011/0311664 A1 Dec. 22, 2011

(51) Int. Cl.
*B29C 45/40* (2006.01)

(52) U.S. Cl. ............. 425/3; 425/443; 425/556; 264/334

(58) Field of Classification Search ............. 425/3, 443, 425/556; 264/334, 336
See application file for complete search history.

(56) References Cited

U.S. PATENT DOCUMENTS

| 6,346,209 B1 * | 2/2002 | Messemer et al. ............ 425/443 |
| 6,371,436 B1 * | 4/2002 | Westhoff et al. ................ 249/63 |
| 7,910,161 B2 * | 3/2011 | Nishimura et al. ............... 425/3 |
| 2011/0250305 A1 * | 10/2011 | Moon et al. ...................... 425/3 |

FOREIGN PATENT DOCUMENTS

| JP | 05050475 | * | 3/1993 |
| JP | 5-245847 | | 9/1993 |
| JP | 2000-301580 | | 10/2000 |
| JP | 2004106354 | * | 4/2004 |
| JP | 2005-254514 | | 9/2005 |
| JP | 2007-098957 | | 4/2007 |

* cited by examiner

*Primary Examiner* — Richard Crispino
*Assistant Examiner* — Thukhanh Nguyen
(74) *Attorney, Agent, or Firm* — Jordan and Hamburg LLP

(57) ABSTRACT

A burden of exchanging ejector rods is reduced in an injection molding machine when exchanging rods during exchange of a die. A plurality of rod insertion holes are formed so as to pierce through a movable platen. A plurality of ejector rods are inserted into rod insertion holes so as to slide freely therein. An ejector plate is disposed at the rear side of the movable platen. In a plurality of the ejector rods, a plurality of base rods are inserted into rod insertion holes so as to slide freely therein. Their base end portions are fixed to the ejector plate. Detachable rods are removably stuck with magnetism to the base rods by first and second magnets.

11 Claims, 14 Drawing Sheets

EJECTOR DEVICE OF INJECTION MOLDING MACHINE

BACKGROUND OF THE INVENTION

The present invention relates to an ejector device of an injection molding machine, and in particular is one comprising a plurality of magnetic rod fixing means each of which is capable of fixing a portion or whole of each ejector rod to an ejector plate with magnetism of one or more permanent magnets in a detachable manner.

In the prior art, with an injection molding machine, dies (a fixed die and a movable die) are attached to a fixed platen and to a movable platen, and the movable platen is driven in directions to approach towards the fixed platen and to be withdrawn therefrom, and thereby closing and opening of the dies are performed. Synthetic resin in the molten state is supplied to a cavity within the dies that are closed together, and this synthetic resin in the molten state hardens so that a molded product is formed; and, after opening of the dies, this molded product is ejected from the movable die by an ejector device.

With an ejector device of an injection molding machine, an ejector plate is disposed at the rear side of the movable platen, one or a plurality of ejector pins (i.e. ejector rods) are inserted through the movable platen so as to slide freely therein, and the base end portions of these ejector pins are fixed to the ejector plate. By the ejector plate being driven in the directions to approach the platen and to be withdrawn therefrom, the ejector pins are driven forwards and backwards between eject positions in which they are advanced and wait positions in which they are retracted.

A construction is known (for example, refer to Patent Document #1) in which the ejector pins are made as single continuous unitary type pins, with the base end portions of these ejector pins being fixed to the ejector plate and with the ejector pins piercing through the ejector plate and a retainer plate being engaged to the ejector plate from its rear side by a plurality of bolts, so that base end flange portions of the ejector pins are sandwiched between the ejector plate and the retainer plate; and also a construction is known (for example, refer to Patent Document #2) in which the base end portions of the ejector pins are engaged to the ejector plate by being screwed thereinto.

And, with the ejector device of an injection molding machine described in Patent Document #3, an air cylinder is fixed to the ejector plate so as to face towards the platen, and base end flange portions of the ejector pin is linked via joint to the cylinder rod of the air cylinder. The base end flange portions of the ejector pin is engaged to concave portions of the joint in a manner so that their engagement can be released from the direction orthogonal to the axis, and is fixed by a bolt so as to rotate. The ejector pin can be exchanged by removing the bolt.

With regard to the ejector device of an injection molding machine described in Patent Document #4, each ejector pin include a tip end side ejector pin passing through a incorporated die that is assembled to the die, and a base end side ejector pin whose base end portion is fixed to the ejector plate, and the tip end side ejector pin is pressed and driven by the base end side ejector pin. In order to prevent operational faults due to thermal expansion of the embedded portion, the construction is adapted to permit some shifting of the tip end side ejector pin in directions orthogonal to the axis.

Patent Document #1: Japanese Laid-Open Patent Publication No. 5-245847;
Patent Document #2: Japanese Laid-Open Patent Publication No. 2000-301580;
Patent Document #3: Japanese Laid-Open Patent Publication No. 2007-98957;
Patent Document #4: Japanese Laid-Open Patent Publication No. 2005-254514.

SUMMARY OF THE INVENTION

In conventional ejector device of the injection molding machine, when exchanging the die on the injection molding machine, sometimes it becomes necessary to exchange the ejector pins, in order to change the disposition of the ejector pins to correspond to the new die (i.e. to the shape and size of new die, and so on). However, with a construction in which each ejector pins is made as single continuous integral type pin whose base end portions of the ejector pint is fixed to the ejector plate as in Patent Documents #1 and #2, the burden of this task of exchanging the ejector pins is heavy, and the time and cost required for exchanging the ejector pins are also great.

In other words, with the ejector device described in Patent Document #1, the retainer plate must be removed from and fitted back to the ejector plate when exchanging the ejector pins, and due to this a plurality of bolts must be operated and moreover the ejector pins must be removed and fitted from the rear side of the retainer plate, and this requires a great deal of work and a lot of trouble.

Moreover, regarding the ejector device described in Patent Document #2, when exchanging the ejector pins, the ejector pins are rotated and the base end portions of the ejector pins are disengaged from and engaged to the ejector plate, and in particular, when engaging the base end portions of the ejector pins to the ejector plate, it is necessary to perform positioning of the base end screw portions of the ejector pins against the screw holes in the ejector plate and to exert a large force for rotating the ejector pins in this state, which imposes a great burden. Moreover there is a possibility that, at this time, the ejector plate may be damaged.

And, regarding the ejector device described in Patent Document #3, the base end flange portions of the ejector pint is removably engaged to the concave portion of the joint that is linked to the air cylinder from a direction orthogonal to the axis, and is fixed by bolt being screwed tight therein, and it is possible to remove these bolt in order to exchange the ejector pin, but it is difficult to shift the base end flange portions of the ejector pin in the directions orthogonal to the axis in the state in which the ejector pin is passed through the platen, in other words to perform the linking to the joint and the release of such linking; and it is also quite absurd to provide a plurality of air cylinders that include air cylinders that are not used, in order to correspond to changes of configuration of the ejector pins.

And, in the case of a medium or large sized injection molding machine (some hundreds of tons class or one thousand and some hundreds of tons class), it often happens that the arrangement of the ejector pins must be changed when exchanging the die, so that the task of exchanging the ejector pins is required repeatedly. However, the lengths and the thicknesses of the ejector pins are great, and for example, with an injection molding machine of approximately 650 tons, the diameters of the ejection pins may be approximately 35 to 50 mm and their lengths may be approximately 1 m, so that the weight of the ejector pin also becomes great. Consequently, the burden of the task of exchanging the ejector pins becomes extremely great.

An object of the present invention is to provide an ejector device of an injection molding machine, which is capable of fixing a portion or whole of each ejector rod to the ejector plate by magnetism in a removable manner, and in particular with which, during exchange of the die on the injection molding machine, when the ejector rods are to be exchanged, it is possible to reduce the burden of the task of ejector rod exchange, so that it is possible to reduce the time and the cost required for exchange of the ejector rods.

An ejector device of an injection molding machine that ejects a molded product from a die fixed to a platen of the injection molding machine, includes: a plurality of rod insertion holes (i.e., pin insertion holes) formed so as to pierce through the platen; a plurality of ejector rods (i.e., ejector pins) that are inserted into all or some of the plurality of rod insertion holes so as to slide freely therein; an ejector plate that is disposed at the rear side of the platen; an ejector drive means for driving the ejector plate with respect to the platen in directions to approach towards and to withdraw from the platen; and a plurality of magnetic rod fixing means that generate magnetism for removably fixing some or all of the ejector rods to the ejector plate.

The ejector rods that are to be used may be made on the basis of the dies that are to be attached to the platen, and some or all of the required ejector rods may be installed to the ejector plate. When exchanging the die on the injection molding machine, then, corresponding to the new die, the ejector rods may be exchanged by removing some or all of the unnecessary ejector rods from the ejector plate and by installing some or all of the newly required ejector rods to the ejector plate, from the die fixing surface of the platen.

The magnetic rod fixing means may employ the following structure when generating magnetism for removably fixing some of the ejector rods to the ejector plate.

The plurality of ejector rods may comprise a plurality of base rods that are inserted into all or some of the plurality of rod insertion holes so as to slide freely therein and whose base end portions are fixed to the ejector plate, and a plurality of detachable rods that can be fitted to and removed from at least some of these base rods; and each of the magnetic rod fixing means may attract the base end portion of the detachable rod to the tip end portion of the base rod with magnetism. And the base end portions of the base rods may be engaged to the ejector plate by screw engagement.

A clamp plate including a plurality of magnet units for attracting the die with magnetism may be fixed to a die fixing surface of the platen, and a plurality of plate side rod insertion holes may be formed in the clamp plate and may communicate respectively with the plurality of rod insertion holes. And, when the ejector rods are projected in their eject positions, the tip end portions of the base rods may be positioned more towards the platen side than the die.

The magnetic rod fixing means may comprise a plurality of first magnets provided on the tip end portion of the base rod at regular intervals around the circumferential direction and arranged so that the magnetic poles of adjacent magnets in the circumferential direction are opposite, and a plurality of second magnets provided on the base end portions of the detachable rod at regular intervals in the circumferential direction and arranged so that the magnetic poles of adjacent magnets in the circumferential direction are opposite. And the magnetic rod fixing means may attract the base end portions of the detachable rod to the tip end portion of the base rod by the positions in the circumferential direction of ones of the first and the second magnets whose magnetic poles are opposite being made to match one another, and may be made so that the detachable rod can be removed from the base rod by rotating the detachable rod with respect to the base rod from this state, thus taking advantage of the repulsive force of the first and the second magnets whose magnetic poles are the same.

The magnetic rod fixing means may comprise a magnet provided to at least one of the tip end portion of the base rod and the base end portion of the detachable rod; and a attracting force reduction means may be provided that decreases the attracting force by the detachable rod being rotated with respect to the base rods from the state in which the base end portion of the detachable rod and the tip end portion of the base rod is attracted together. And there may be provided engagement hole formed at central portion of one of the tip end portions of the base rods and the base end portion of the detachable rod, and engagement pin made from a non-magnetic material and attached to the central portion of the other of the tip end portion of the base rod and the base end portion of the detachable rod, so as to project and so as to engage with the engagement hole.

When the magnetic rod fixing means generates magnetism for removably whole of the ejector rod to the ejector plate, the following structures may be employed.

The ejector rods may be made as single continuous integral type ejector rod; and the magnetic rod fixing means may comprise magnets for generating magnetism for fixing the integral type ejector rod to the ejector plate, provided to at least one of the base end portion of the ejector rod and the site on the ejector plate where the ejector rod contact against it. And there may be provided a attracting force reduction means that decreases the sattracting force by the ejector rod being rotated from the state in which the ejector rod and the ejector plate are attracted together.

According to the ejector device of an injection molding machine since, along with providing the plurality of rod insertion holes, the plurality of ejector rods, the ejector plate, and the ejector drive means, in particular, there is provided a plurality of magnetic rod fixing means that generate magnetism for removably fixing some or all of the ejector rods to the ejector plate, accordingly it is possible reliably to fit and remove some or all of the ejector rods to the ejector plate from the die fixing side of the platen in a simple manner. The ejector rods that are to be used may be made on the basis of the dies that are to be attached to the platen, with some or all of the required ejector rods being installed to the ejector plate. And, when exchanging the die on the injection molding machine, it is possible to exchange the ejector rods in a simple manner, so as to remove from the ejector plate some or all of the ejector rods that are unnecessary, according to the new die, and so as also to install to the ejector plate some or all of the ejector rods that are newly required, from the die fixing side of the platen. In other words, it is possible to reduce the burden of the task of exchanging the ejector rods, and consequently it is possible to reduce the time and the cost required for exchanging the ejector rods.

Since the plurality of ejector rods comprises the plurality of base rods that are inserted into all or some of the plurality of rod insertion holes so as to slide freely therein and whose base end portions are fixed to the ejector plate, and the plurality of detachable rods that can be fitted to and removed from at least some of these base rods, and each of the magnetic rod fixing means attracts the base end portion of the detachable rod to the tip end portion of the base rod with magnetism, Accordingly, by fixing to the ejector plate in advance a plurality of base rods arranged on the basis of the dies which it is expected will be used with the injection molding machine, it is possible, during exchange of the die on the injection molding machine, to remove from the base rods some of the detachable rods that, corresponding to the new die, are unnecessary, and to install to the base rods some of the detachable rods that are newly required, from the die fixing side of the platen, and thus it is possible to exchange the detachable rods in a simple manner; and, at this time, since it is sufficient to exchange only the detachable rods, and not the entire ejector rods including the base rods, accordingly it is possible to reduce the burden of exchanging the ejector rods by a substantial level.

Since the base end portions of the base rods are engaged to the ejector plate by screw engagement, accordingly it is possible to simplify the construction for fixing the base end portions of the base rods to the ejector plate.

Since the clamp plate including a plurality of magnet units for attracting the die with magnetism is fixed to the die fixing surface of the platen, and the plurality of plate side rod insertion holes are formed in the clamp plate and communicate respectively with the plurality of rod insertion holes, accordingly it is possible to perform attachment and removal of the die to the platen reliably in a simple manner.

Since, when the ejector rods are projected in their eject positions, the tip end portions of the base rods are positioned more towards the platen side than the die, accordingly it is possible to prevent the occurrence of the operational fault of the base rod that is not in use interfering with the die.

Since the magnetic rod fixing means comprises the plurality of first magnets provided on the tip end portion of the base rod at regular intervals in the circumferential direction and arranged so that the magnetic poles of adjacent magnets in the circumferential direction are opposite, and the plurality of second magnets provided on the base end portion of the detachable rod at regular intervals in the circumferential direction and arranged so that the magnetic poles of adjacent magnets in the circumferential direction are opposite, accordingly, when exchanging the detachable rods, first the base end portions of the detachable rods are reliably attracted to the tip end portions of the base rods in the rotational position of the detachable rod in which the positions in the circumferential direction of the first and second magnets agree with one another; and then, by rotating the detachable rods with respect to the base rods, it is possible to remove the detachable rods from the base rods in a simple manner by taking advantage of the repulse force of the first and second magnets whose magnetic poles are the same.

Since each of the magnetic rod fixing means attracts the base end portion of the detachable rod to the tip end portion of the base rod by the positions in the circumferential direction of the first and the second magnets whose magnetic poles are opposite being made to match one another, and is made so that the detachable rod can be removed from the base rod by rotating the detachable rod with respect to the base rod from this state, thus taking advantage of the repulsive force of the first and the second magnets whose magnetic poles are the same, accordingly similar advantages are obtained as with claim 6.

Since each of the magnetic rod fixing means comprises a magnet provided to at least one of the tip end portion of the base rod and the base end portion of the detachable rod, and the attracting force reduction means is provided that decreases the attracting force by the, detachable rod being rotated with respect to the base rod from the state in which the base end portions of the detachable rods and the tip end portion of the base rod is attracted together. Accordingly the construction of the magnetic rod fixing means is simplified and the base end of the detachable rod is reliably attracted to the tip end portion of the base rod, and it is possible to remove the detachable rod from the base rod in a simple manner by rotating it with respect to the base rod.

Since there is provided the engagement hole formed at central portion of one of the tip end portion of the base rod and the base end portion of the detachable rod, and the engagement pin made from a non-magnetic material and attached to the central portion of the other of the tip end portion of the base rod and the base end portion of the detachable rod, so as to project and so as to engage with the engagement hole, accordingly it is possible, due to the positional determination function provided by the engagement hole and the engagement pin, and because the engagement pin is made from a non-magnetic material, to suppress the generation of unnecessary attracting force due to magnetism between the engagement pin and one of the base rod on the engagement hole side and the detachable rod, and it is possible to fit and to remove the detachable rod to and from the base rod reliably and smoothly from the die fixing side of the platen; and, moreover, due to the engagement between the engagement hole and the engagement pin, it is possible to prevent detachment occurring between the tip end portion of the base rod and the base end portion of the detachable rod.

Since the ejector rods are made as continuous integral type ejector rods, and each of the magnetic rod fixing means comprises a magnet for generating magnetism for fixing the integral type ejector rod to the ejector plate, provided to at least one of the base end portion of the ejector rod and the site on the ejector plate where the ejector rod contacts against it, accordingly, when exchanging the die on the injection molding machine, it is possible to exchange the ejector rods in a simple manner, so as to remove from the ejector plate those of the ejector rods that are unnecessary, according to the new die, and so as also to install to the ejector plate those of the ejector rods that are newly required, from the die fixing side of the platen. Moreover it is possible to reduce the load on the ejector drive means, since it will be sufficient to install to the ejector plate only those ones of the ejector rods that are necessary.

Since the attracting force reduction means that decreases the attracting force by the integral type ejector rod being rotated from the state in which the unitary type ejector rod and the ejector plate are attracted together is provided, accordingly it is possible to remove the ejector rods from the ejector plate in a simple manner by rotating the integral type ejector rods from the die fixing surface side of the platen.

DETAILED DESCRIPTION OF SPECIFIC EMBODIMENTS

The ejector device of an injection molding machine of the present invention that ejects a molded product from a die fixed to a platen of the injection molding machine comprises; a plurality of rod insertion holes formed so as to pierce through the platen; a plurality of ejector rods that are inserted into all or some of the plurality of rod insertion holes so as to slide freely therein; an ejector plate that is disposed at the rear side of the platen; an ejector drive means for driving the ejector plate with respect to the platen in directions to approach towards and to withdraw from the platen; and a plurality of magnetic rod fixing means that generate magnetism for removably fixing some or all of the ejector rods to the ejector plate.

Embodiment 1

Figure 1:
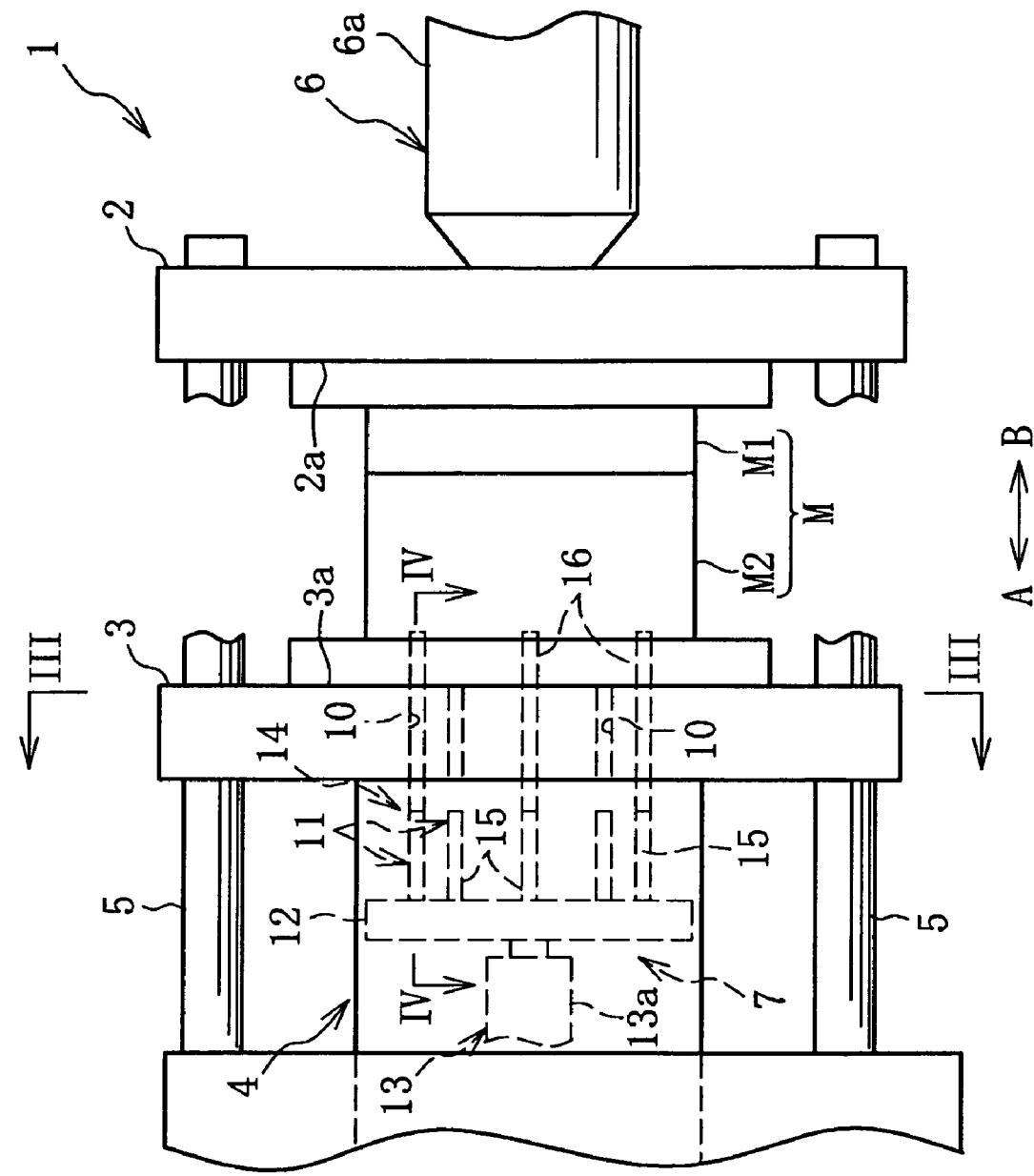
FIG. 1 is an elevation view of an ejector device and a set of dies (closed state) of an injection molding machine according to Embodiment 1.
Figure 2:
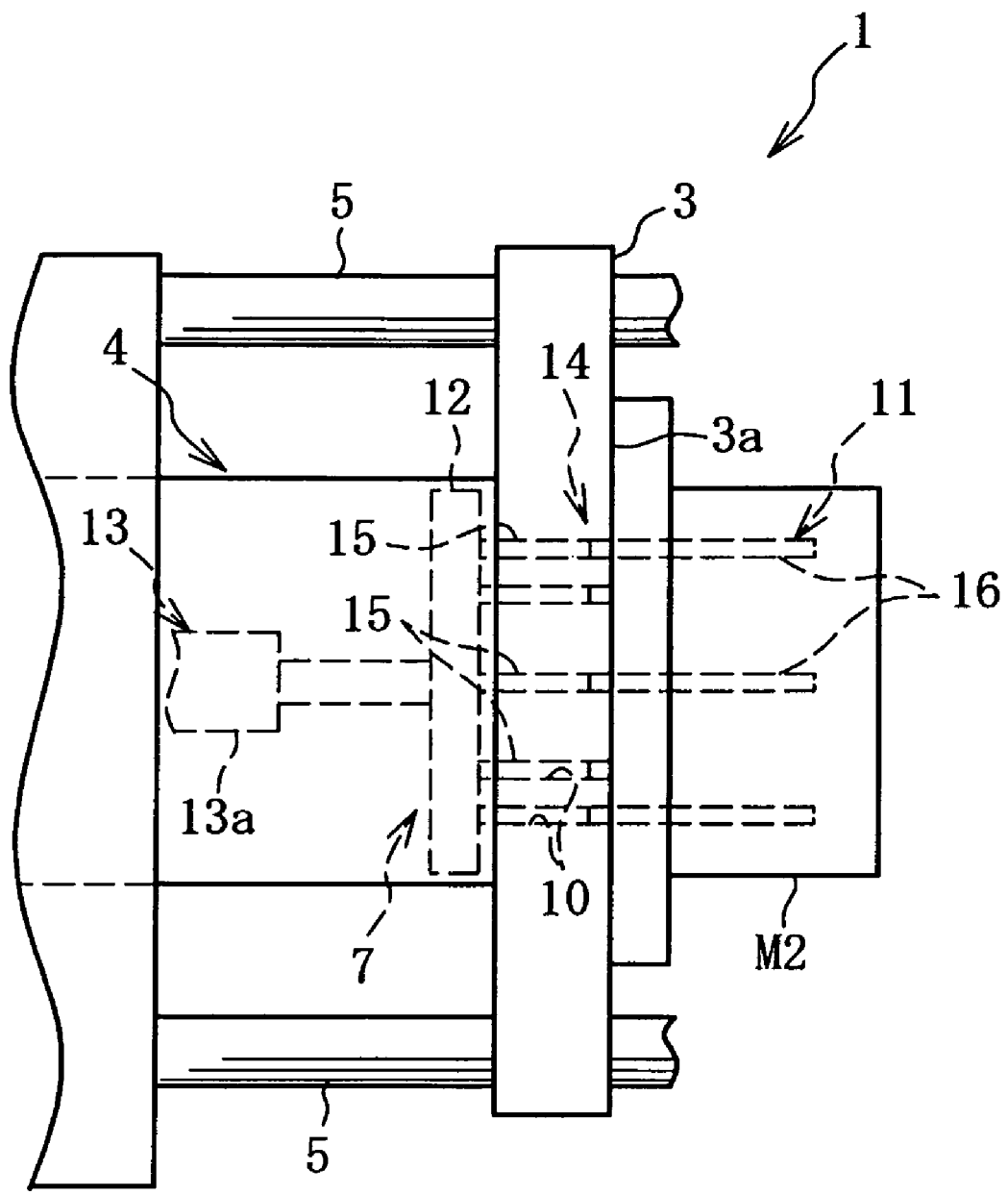
FIG. 2 is an elevation view of the essential portion of the injection molding machine and the die (opened state)
Figure 3:
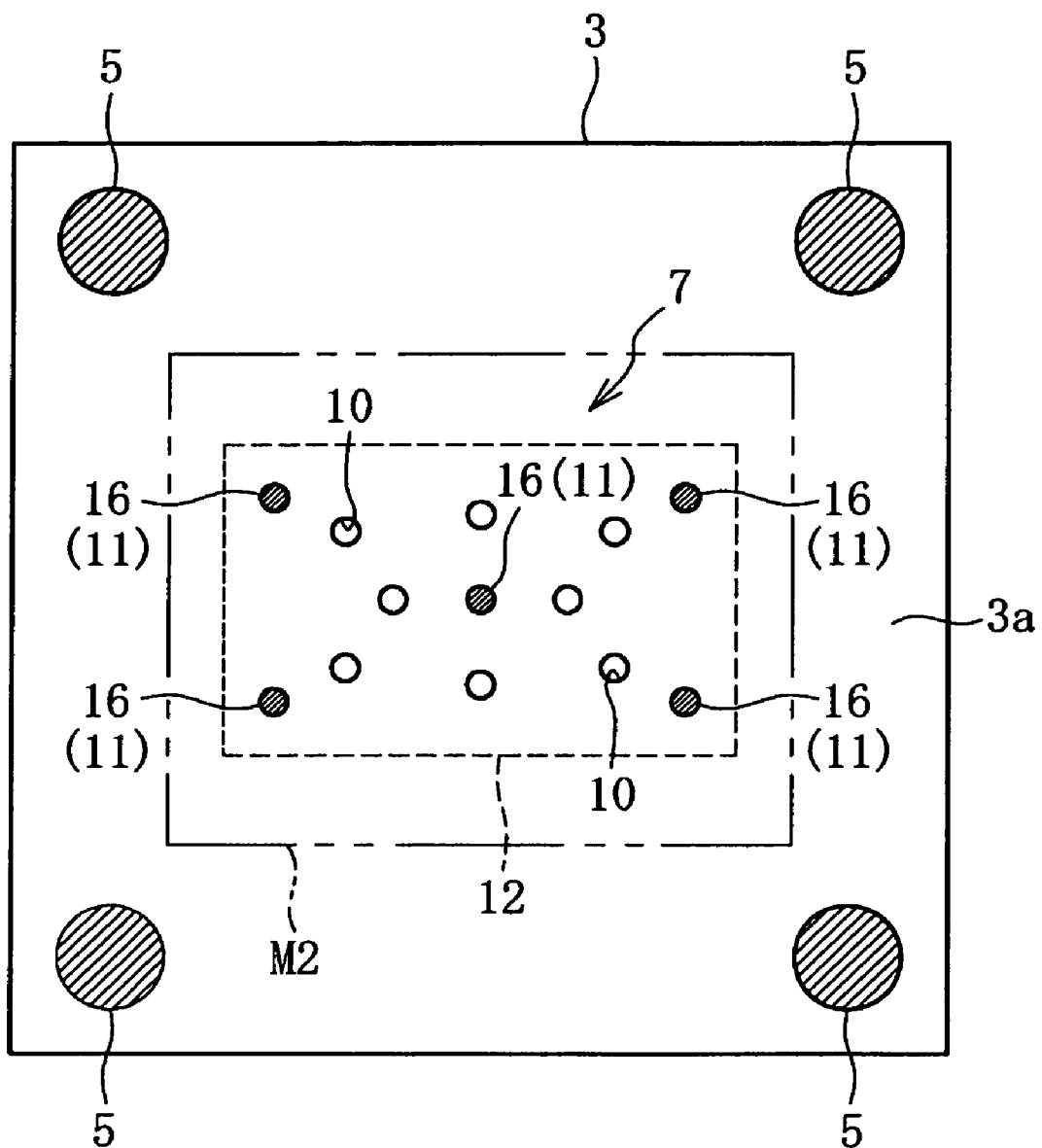
FIG. 3 is a sectional view along the line of FIG. 1.

As shown in FIGS. 1 through 3, an injection molding machine 1 comprises: a pair of platens 2, 3 (a fixed platen 2 and a movable platen 3) that face one another and to which a set of dies M (a fixed die M1 and a movable die M2) is fixed; a platen drive mechanism 4 including a hydraulic cylinder (or a drive motor) for driving the movable platen 3 in directions to approach to or withdraw from the fixed platen 2 when perform closing or opening of the die M, four guide rods 5 that support the movable platen 3 and guide it so that it can shift freely in the above approach and withdrawal directions; an injection mechanism 6 including an injection barrel 6a for supplying synthetic resin in the molten state to a cavity within the die M when it is closed; and an ejector device 7 for ejecting the molded product from the movable die M2.

The fixed die M1 is fixed by a plurality of mechanical clamp devices (not shown in the figure) to a die fixing surface 2a of the fixed platen 2, and, in a similar manner, the movable die M2 is fixed by a plurality of mechanical clamp devices (not shown in the figure) to a die fixing surface 3a of the movable platen 3. Dies of a plurality of types and of different sizes and shapes can be fitted to these die fixing surfaces 2a and 3a, and removed therefrom.

When injection molding is to be performed with this injection molding machine 1, the movable platen 3 is driven by the platen drive mechanism 4 in the direction to approach towards the fixed platen 2, and, as shown in FIG. 1, the movable die M2 is pressed against the fixed die M1 so that they are in the closed state, and, in this state, synthetic resin in the molten state is supplied from the end of the injection barrel 6a into the cavity within the die M, so that a molded product is formed. Thereafter, the movable platen 3 is driven by the platen drive mechanism 4 in the direction to withdraw from the fixed platen 2, and, as shown in FIG. 2, the movable die M2 is pulled away from the fixed die M1 so that they are in the opened apart state, and, in this state, the molded product is ejected from the movable die M2 by the ejector device 7.

Now, the details of the ejector device 7 will be explained.

The reference numeral A in FIG. 1 denotes the leftwards direction, while the reference numeral B denotes the rightwards direction.

As shown in FIGS. 1 through 9, the ejector device 7 comprises a plurality of rod insertion holes 10 (for example, thirteen thereof) that are formed to pierce through the movable platen 3 in the left to right direction, a plurality of long ejector rods 11 (for example, thirteen thereof) that extend in the left to right direction and are inserted into the plurality of rod insertion holes 10 respectively so as to slide freely therein, an ejector plate 12 that is disposed at the rear side of the movable platen 3 (i.e. at its left side), an ejector drive mechanism 13 for driving the ejector plate 12 with respect to the movable platen 3 in the leftward and rightward directions so that it approaches towards and withdraws from the movable platen 3, and a plurality of magnetic rod fixing mechanisms 14 that generate magnetism for fixing detachable rods 16, that are parts of the ejector rods 11, to the ejector plate 12 in a detachable manner.

The number of the plurality of rod insertion holes 10 and their arrangement, the diameters of these rod insertion holes 10, the number of the plurality of ejector rods 11 and their arrangement, the lengths and is the diameters of these ejector rods 11, and the size of the ejector plate 12 and so on, are set on the basis of the various types of dies that are expected to be used with this injection molding machine 1. The ejector drive mechanism 13 has a fluid pressure cylinder 13a. By the ejector plate 12 being driven by this ejector drive mechanism 13 in the leftwards and rightwards directions with respect to the movable platen 3, the ejector pins 11 are driven forwards and backwards between eject positions in which they are advanced (refer to FIG. 2) and wait positions in which they are retracted (refer to FIG. 1).

Each of ejector rods 11 comprises a base rod 15 (for example, thirteen thereof) made from a magnetic material (for example, steel) that is inserted into the rod insertion hole 10 so as to be able to slide freely therein and whose base end portion is fixed to the ejector plate 12, and a detachable rod 16 made from a magnetic material (for example, steel) that can be fitted to and removed from the tip end portion of the base rod 15. It is so arranged that, when the ejector rods 11 are in their eject positions, the tip end portions of the base rods 15 to be located at positions that are towards the movable platen 3 (i.e. towards the left side) than the movable die M2 (refer to FIG. 2).

Figure 4:
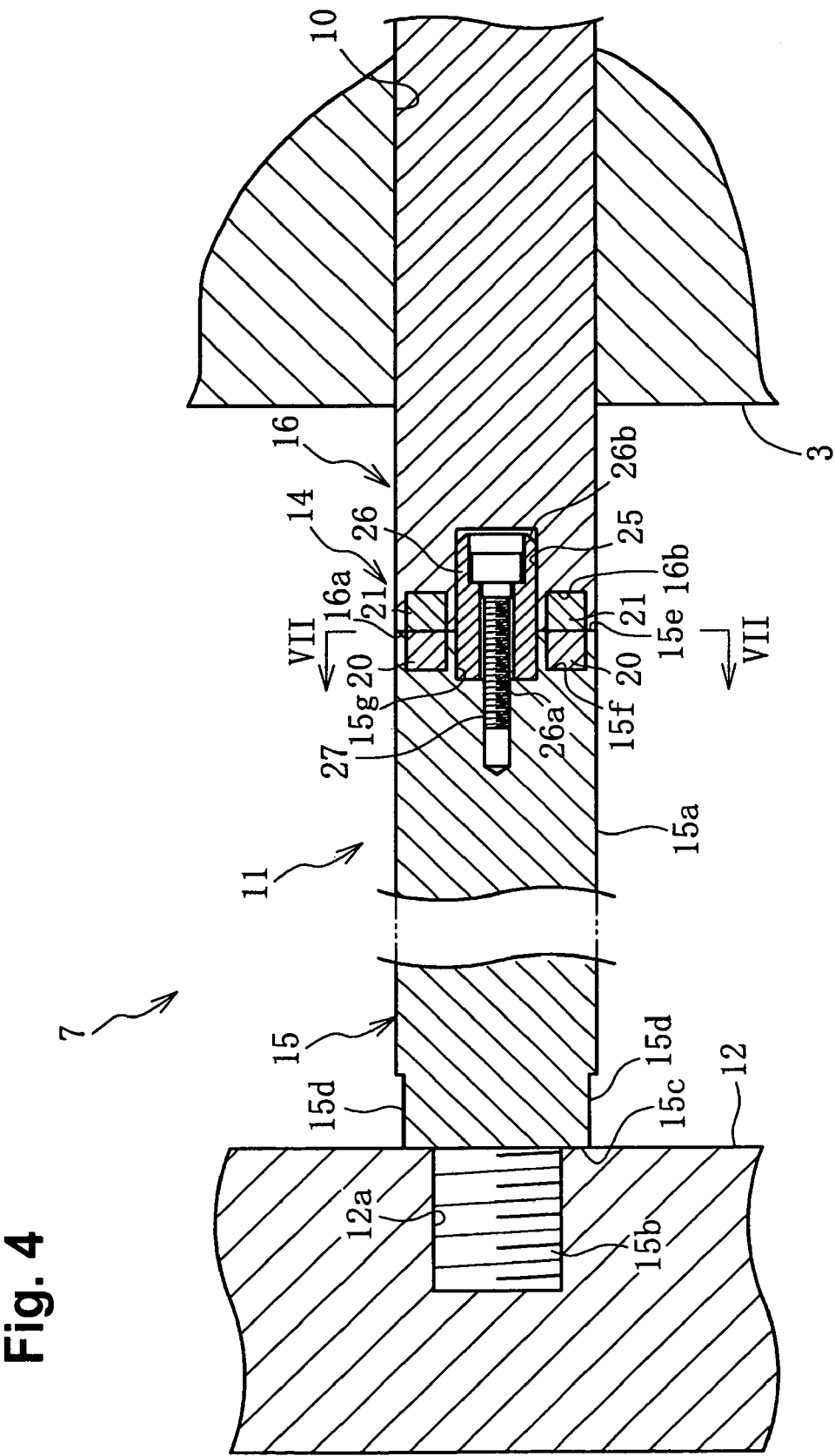
FIG. 4 is a sectional view along the line IV-IV of FIG. 1.

As shown in FIG. 4, at the base end portion (i.e. the left end portion) of each of the base rods 15, a threaded shaft 15b is formed that is of smaller diameter than the main body 15a of the base rod 15, and this screw shaft 15b is screwed into a threaded hole 12a formed in the ejector plate 12 and is thereby engaged therewith, with a step portion 15c defined at the boundary between the rod main body 15a and the screw shaft 15b being pressed against the ejector plate 12, so that thereby the base end portion of the base rod 15 is screwed into and engaged with the ejector plate 12. In order to rotate the base rod 15, a pair of flattened engagement surfaces 15d, to which a tool such as a wrench may be engaged, are formed on the external circumferential surface of the rod main body 15a at its base end.

Plural sets of detachable rods 16 having different lengths and numbers are provided, based on the plurality of types of dies that are expected to be used with this injection molding machine 1. For example, for each rod insertion hole 10, one detachable rod 16 may be provided, or a plurality thereof having different lengths may be provided. However by arranging, for a plurality of detachable rods 16 whose diameters are the same, to use a single detachable rod 16 of that same diameter repeatedly, it is possible to reduce the number of detachable rods 16.

As shown in FIGS. 4 through 9, the magnetic rod fixing mechanism 14 is a system for sticking the base end portion (i.e. the left end portion) of each of the detachable rods 16 to the tip end portion (i.e. the right end portion) of corresponding base rod 15 by magnetism, and the magnetic rod fixing mechanism 14 comprises a plurality of first magnets 20 (for example four thereof) that are provided at the tip end portion of each of the base rods 15, and a plurality of second magnets 21 (for example four thereof) that are provided at the base end portion of each of the detachable rods 16. Both the tip end surface 15e of the base rod 15 and the base end surface 16a of the detachable rod 16 are formed as smooth vertical surfaces, and these surfaces 16e, 16a are mutually contacted together and are fixed in a stable state by this magnetism. For example, the magnets 20, 21 may be neodymium magnets.

Figure 5:
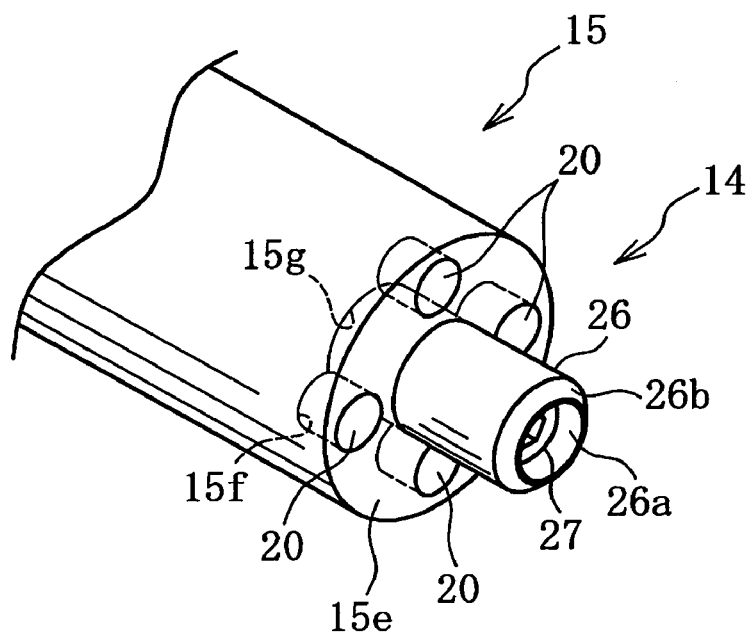
FIG. 5 is a perspective view of the tip end portion of a base rod.

As shown in FIGS. 4, 5, the plurality of first magnets 20 are fitted on the tip end portion of the base rod 15, at radially outward positions from its central portion and at regular intervals (for example, 90°) around its circumferential direction, and are arranged so that the magnetic poles of neighboring ones in the circumferential direction of these magnets 20 are opposite right-to-left. Each of these first magnets 20 is formed in the shape of a circular cylinder, and is quite short in length and has a diameter around ¼ of the diameter of its base rod 15. These plurality of first magnets 20 are fitted into magnet fitting apertures 15f formed in the base rod 15 and are fixed thereinto by adhesive, so that their tip end surfaces face out onto the tip end surface 15e of the base rod 15.

Figure 6:
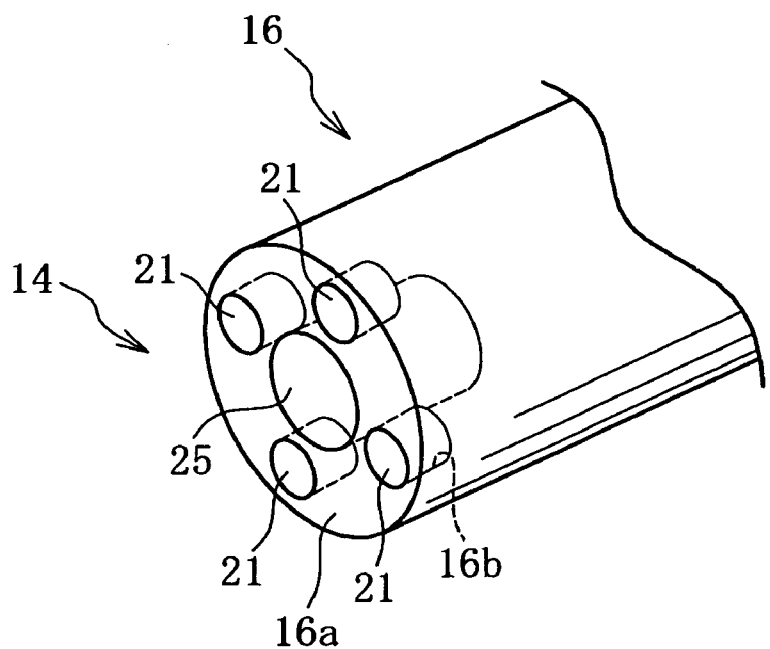
FIG. 6 is a perspective view of the base end portion of a detachable rod.
Figure 7:
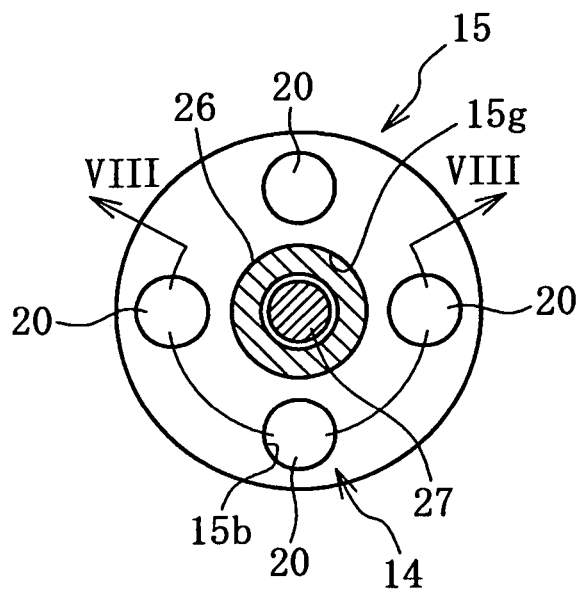
FIG. 7 is a sectional view along the line VII-VII of FIG. 4.

As shown in FIGS. 4, 6, in a similar manner, the plurality of second magnets 21 are fitted on the base end portion of the detachable rod 16, at radially outward positions from its central portion and at regular intervals (for example, 90° around its circumferential direction, and are arranged so that the magnetic poles of neighboring ones in the circumferential direction of these magnets 21 are opposite left and right-to-left. Each of these second magnets 21 is formed in the shape of a circular cylinder, and is quite short in length and has a diameter around ¼ of the diameter of its detachable rod 16. These plurality of second magnets 21 are fitted into magnet fitting apertures 16b formed in the detachable rod 16 and are fixed thereinto by adhesive, so that their base end surfaces face out onto the base end surface 16a of the detachable rod 16.

Figure 8:
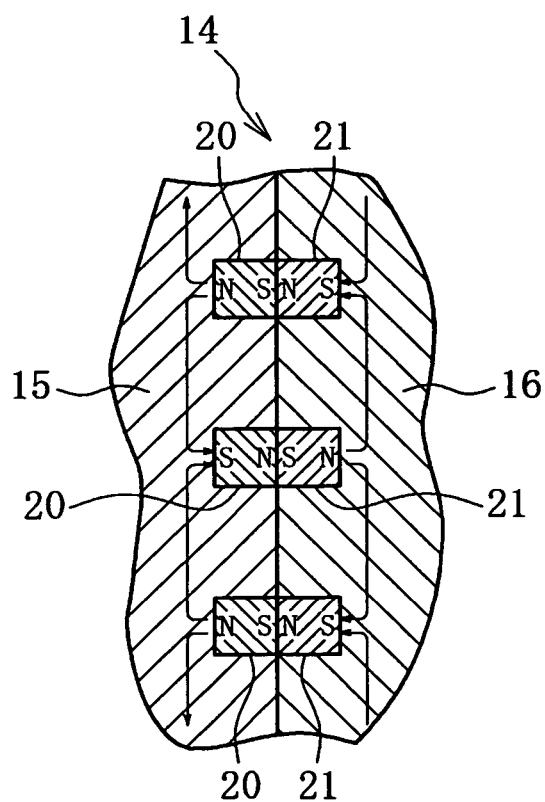
FIG. 8 is a sectional view along the line VIII-VIII of FIG. 7, showing the state in which the base rod and the detachable rod are attracted together.
Figure 9:
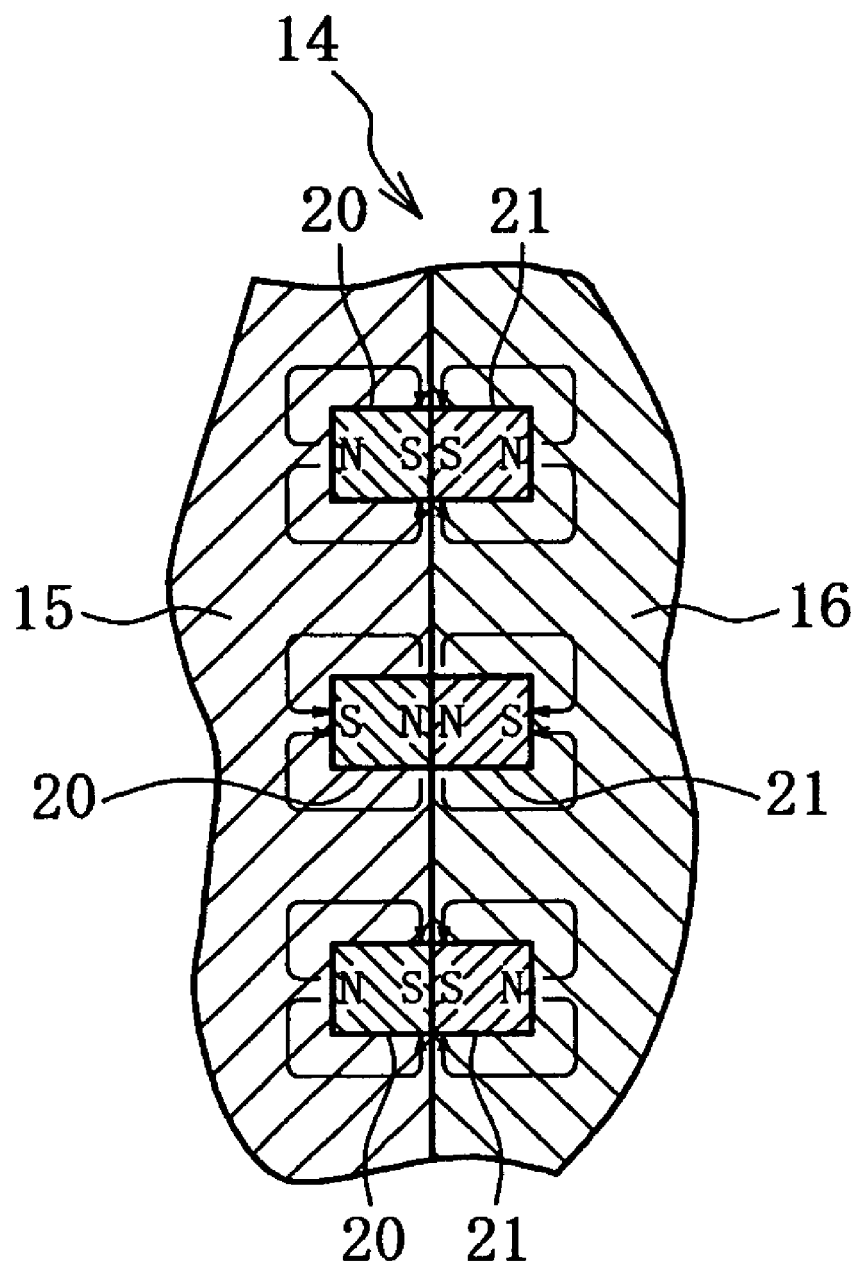
FIG. 9 is a figure corresponding to FIG. 8, showing the state in which the base rod and the detachable rod are not attracted together.
Figure 10:
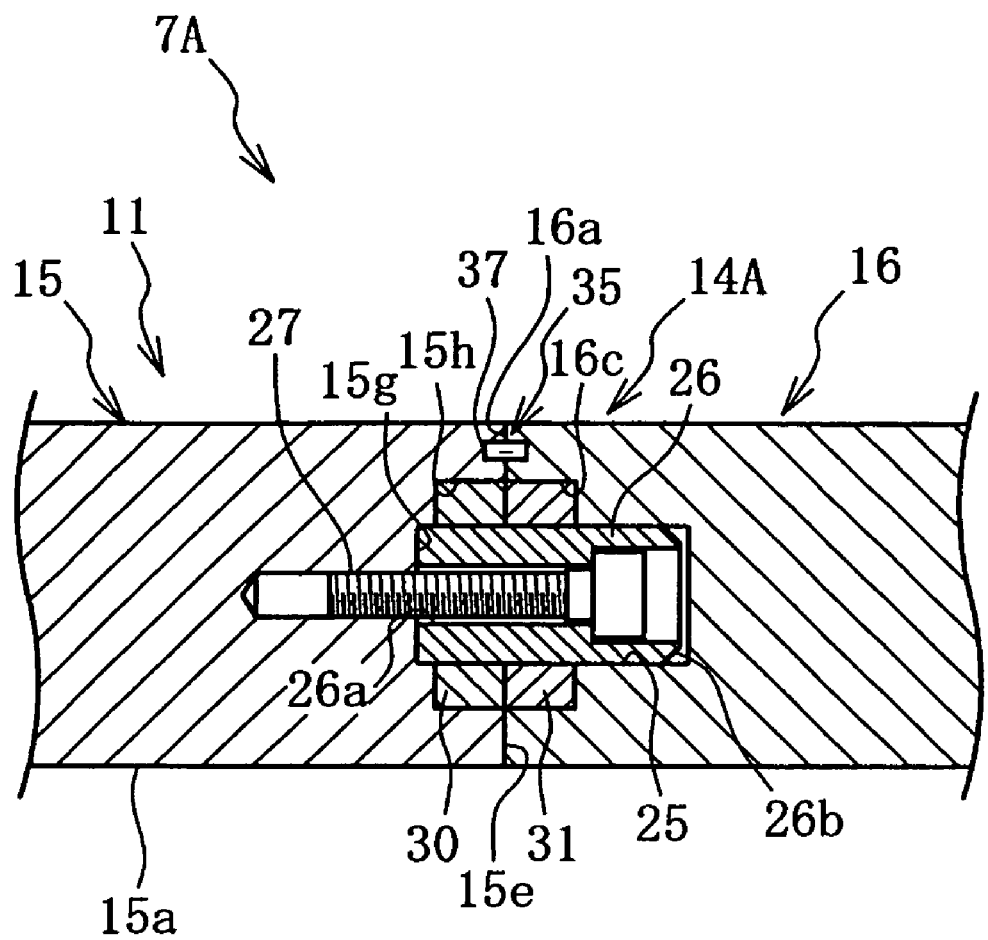
FIG. 10 is a figure corresponding to FIG. 4, for Embodiment 2.
Figure 11:
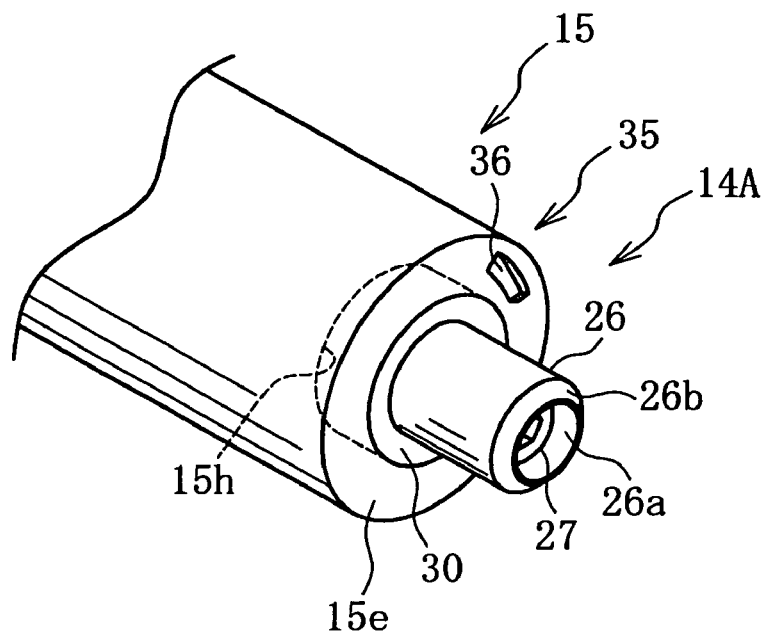
FIG. 11 is a perspective view of the tip end portion of a base rod.
Figure 12:
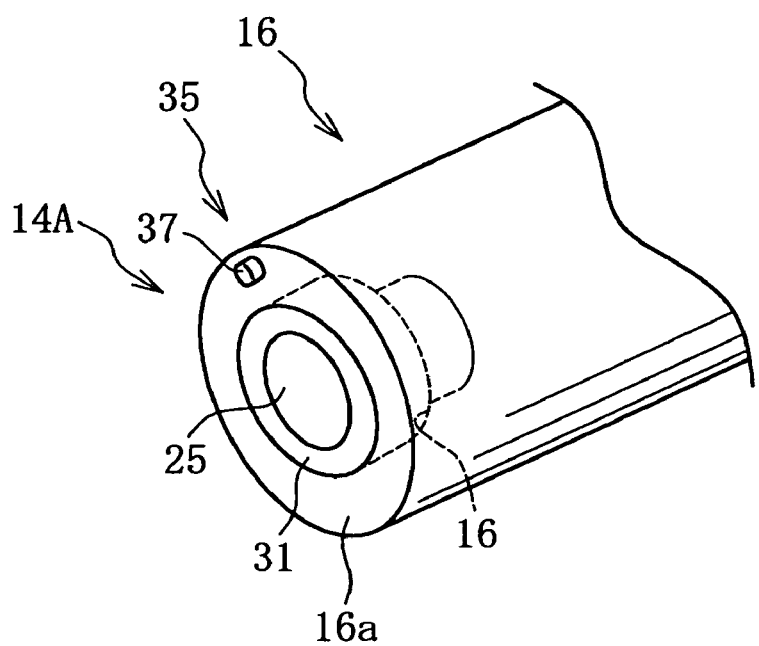
FIG. 12 is a perspective view of the base end portion of a detachable rod.
Figure 13:
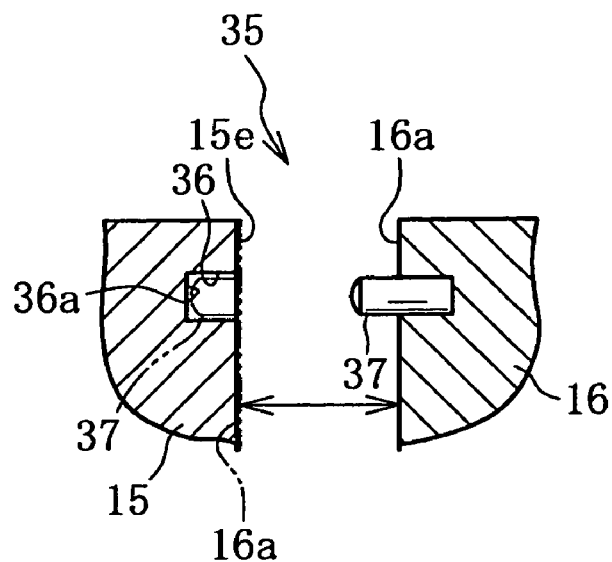
FIG. 13 is a sectional view of a attracting force reduction mechanism.
Figure 14:
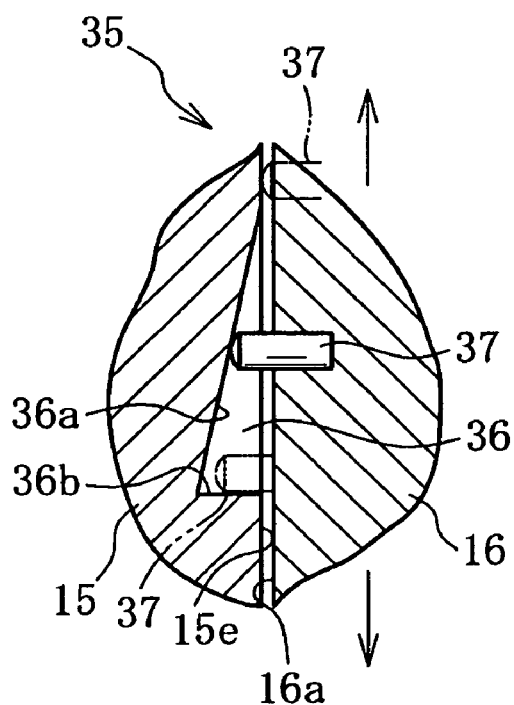
FIG. 14 is a sectional view of the attracting force reduction mechanism.

And, as shown in FIG. 8, by providing the pluralities of first and second magnets 20, 21 to the magnetic fixing mechanism 14, the base end portion of the detachable rod 16 is attracted to the tip end portion of the base rod 15 by coinciding the positions in the circumferential direction of first and second magnets 20, 21 whose magnetic poles are opposite; and moreover when, from this state, by rotating the detachable rod 16 by 90° relatively to the base rod 15, these magnetic poles facing each other become the same, then it is possible to remove the detachable rod 16 from the base rod 15 by taking advantage of the forces of repulsion between the first and second magnets 20, 21.

In other words, in the state in which the positions around the circumferential direction of first and second magnets 20, 21 whose magnetic poles are opposite agree with one another, as shown in FIG. 8, then the sticking force becomes maximum. Because the magnetic path due to the four sets of first and second magnets 20, 21 neighboring one another around the circumferential direction becomes the magnetic path shown by the arrow signs in FIG. 8. And when the detachable rod 16 is rotated by 90° from this state, then the repulsive force becomes maximum because the magnetic path due to the first and second magnets 20, 21 becomes the magnetic path shown by the arrow signs in FIG. 9, so that the sticking force is annulled.

As shown in FIGS. 4 to 6, an engagement hole 25 is formed in the central portion of the base end portion of each of the detachable rods 16, n and an engagement pin 26 that is made from a non-magnetic material (for example stainless steel) is fixedly attached to the central portion of the tip end portion of each of the base rods 15 so as to project rightwards and so as to be capable of engaging into the engagement hole 25. The base end portion of this engagement pin 26 is fitted into a pin fitting concave 15g formed in the base rod 15. For this, a bolt 27 is inserted into a stepped hole 26a formed in the engagement pin 26, and the bolt 27 is engaged to the base rod 15 by being screwed thereinto, in the state in which its head portion is engaged into the step portion of the stepped hole 26a. A tapered portion 26b is formed on the external circumferential portion of the tip end of the engagement pin 26, so that the engagement pin 26 can be smoothly inserted into the engagement hole 25 of the detachable rod 16.

Next, the operation of this ejector device 7 of the injection molding machine 1 explained above, and its advantages, will be explained.

Since, along with comprising the plurality of rod insertion holes 10, the plurality of ejector rods 11, the ejector plate 12, and the ejector drive mechanism 13, the ejector device 7 also, in particular, comprises the plurality of magnetic rod fixing mechanism 14 each of which generates magnetism for fixing the detachable rods 16, that is a portion of the ejector rod 11, to the tip end of the base rod 15 in a detachable manner which is fixed to the ejector plate 12, accordingly it is possible to fit and remove the detachable rods 16 of the ejector rods 11 to the ejector plate 12 via the base rod 15 from the die fixing surface side 3a of the movable platen 3 in a simple and easy manner.

Here, the plurality of ejector rods 11 include the plurality of base rods 15 that are inserted into all of the plurality of rod insertion holes 10 so as to slide freely therein and moreover whose base end portions are fixed to the ejector plate 12, and the plurality of detachable rods 16 that can be fitted to and removed from at least a portion of the base rods 15; and the magnetic rod fixing mechanism 14 is an arrangement for sticking the base end portions of the detachable rods 16 to the tip end portions of the base rods 15 with magnetism. In other words, by installing the required detachable rods 16 to the base rods 15, it is possible to make up the ejector rods 11 that are to be used on the basis of the die that is attached to the movable platen 3.

Accordingly, by fixing the plurality of base rods 15 to the ejector plate 12 in advance, arranged on the basis of the dies of plural types that it is anticipated will be used with this injection molding machine, it becomes possible to exchange the ejector rods 11 (i.e. the detachable rods 16) in a simple manner when the dies on this injection molding machine 1 is exchanged, by removing unnecessary detachable rods 16 from their base rods 15 and also by fitting newly required detachable rods 16 to their base rods 15 from the die fixing surface side 3a of the movable platen 3, in correspondence to the new dies; and, at this time, it is only necessary to exchange the detachable rods 16, and not whole of the ejector rods 11 including the base rods 15. In other words, it is possible to reduce remarkably the burden of the task of exchanging the ejector rods 11, and consequently it is possible greatly to reduce the time and the cost required for exchanging the ejector rods 11.

Since the base end portions of the base rods 15 are screwed to the ejector plate 12, accordingly it is possible to simplify the construction for fixing the base end portions of the base rods 15 to the ejector plate 12. And since, when the ejector rods 11 are projected in their eject positions, it is arranged for the tip end portions of the base rods 15 to be positioned on the movable platen 3 side of the movable die M2, accordingly it is possible to avoid the occurrence of the operational fault of those of the base rods 15 that are not being used interfering with the movable die 3.

Each of the magnetic rod fixing mechanism 14 comprises a plurality of first magnets 20 that are provided spaced at regular intervals in the circumferential direction around the tip end portion of the base rod 15 with the magnetic poles of neighboring ones in the circumferential direction of these magnets 20 being disposed so as to be opposite, and a plurality of second magnets 21 that are provided spaced at regular intervals in the circumferential direction around the base end portion of the detachable rod 16 with the magnetic poles of neighboring ones in the circumferential direction of these magnets 21 being disposed so as to be opposite.

This magnetic rod fixing mechanism 14 has a structure with which the base end portions of the detachable rods 16 can be attracted to the tip end portions of the base rods 15 by setting the positions of the first and second magnets 20, 21 around the circumferential direction for opposite magnetic poles thereof to match one another; and, by rotating the detachable rods 16 with respect to the base rods 15 from this state, it is possible to remove the detachable rods 16 from the base rods 15, thus taking advantage of the repulsive force of the first and second magnets 20, 21 whose matching magnetic poles are now the same.

In other words, when exchanging the detachable rods 16, in the rotational positions of the detachable rods 16 in which the positions in the circumferential direction of the first and second magnets 20, 21 agree with one another, it is possible reliably to stick the base end portions of the detachable rods 16 to the tip end portions of the base rods 15; and, moreover, by rotating the detachable rods 16 with respect to the base rods 15, it is possible to take advantage of the repulsive force of the first and second magnets 20, 21 whose magnetic poles are now the same, so as to remove the detachable rods 16 from the base rods 15 in a simple manner.

Due to the provision of the engagement holes 25 formed in the central portions of the base end portions of the detachable rods 16 and of the engagement pins 26 that are made from a non-magnetic material and are fixed to the central portions of the tip end portions of the base rods 15 so as to project and so as to engage into the engagement holes 25, and due to the function of positional determination by the engagement holes 25 and the engagement pins 26, and moreover since it is possible to suppress the generation of any unnecessary sticking force due to magnetism between the engagement pins 26 and the detachable rods 16 because the engagement pins 26 are made from a non-magnetic material, accordingly it is possible reliably and smoothly to fit the detachable rods 16 to the base rods 15 from the die fixing surface side 3a of the movable platen 3 and to remove them therefrom; and furthermore, by the engagement holes 25 and the engagement pins 26 being engaged together, it is possible to prevent the tip end portions of the base rods 15 and the base end portions of the detachable rods 16 from coming away from one another.

Next, Embodiments 2 through 4 will be explained. Here, to structures that are substantially the same as Embodiment 1 the same reference numerals will be appended, and only different structures will be explained.

Embodiment 2

The ejector device 7A of Embodiment 2 is a version in which the magnetic rod fixing mechanism 14 of Embodiment 1 has been changed. As shown in FIGS. 10 through 14, this magnetic rod fixing mechanism 14A comprises annular first magnets 30 that are provided at the tip end portions of the base rods 15, and annular second magnets 31 that are provided at the base end portions of the detachable rods 16; and there is also provided a sticking force reduction mechanism that reduces the sticking force by the detachable rod 16 being rotated with respect to the base rod 15 from the state in which the base end portion of the detachable rod 16 is stuck to the tip end portion of the base rod 15. The magnets 30, 31 may be, for example, neodymium magnets.

The first and second magnets 30, 31 have the same shape, and their inner diameters are approximately the same as the diameter of the engagement pin 25. In the state in which the first magnet 30 is fitted over the outside of the engagement pin 25, it is inserted into and glued into a magnet fitting aperture 15h formed in the base rod 15, so that its tip end surface fronts onto the tip end surface 15e of the base rod 15. And the second magnet 31 is inserted into and glued into a magnet fitting aperture 16c formed in the detachable rod 16, so that its base end surface fronts onto the base end surface 16a of the detachable rod 1, and moreover so that its magnetic polarity is opposite to that of the first magnet 30, with its inner circumferential surface being one with the inner circumferential surface of the engagement hole 25.

The sticking force reduction mechanism 35 comprises a tapered concave groove 36 that is formed in the shape of a circular arc centered on the axis of the base rod 15, and an engagement pin 37 that is attached to and projects from the base end portion of the detachable rod 16, so as to be able to engage into the tapered concave groove 36. The tapered concave groove 36 is provided so as to be of comparatively short extent outward of the first magnet 30 in the radial direction. At one end portion of the tapered concave groove 36 in the circumferential direction, the taper surface 36a of the tapered concave groove 36 joins to the tip end surface 15e of the base rod 15, and a step portion 36b is formed at the other end portion in the circumferential direction of the tapered concave groove 36.

With this sticking force reduction mechanism 35, with the engagement pin 37 contained in the vicinity of the step portion 36b of the tapered concave groove 36 and the tip end surface 15e of the base rod 15 contacted against the base end surface 16a of the detachable rod 16, it is possible to provide reliable sticking with the magnetism of the first and second magnets 30, 31. And when, from this state, the detachable rod 16 is rotated in the direction to remove the engagement pin 37 away from the step portion 36b, the engagement pin 37 engages to the tapered surface 36a, and the rotatory power of the detachable rod 16 is converted into force in the direction to remove the detachable rod 16 from the base rod 15. In other words, by rotating the detachable rod 16, it is possible to decrease the sticking force so as to remove it from the base rod 15.

When fixing the base end portion of the detachable rod 16 to the tip end portion of the base rod 15, if the engagement pin 37 should contact against the tip end surface 15e of the base rod 15, then it is possible, by rotating the detachable rod 16 from this state, to receive the engagement pin 37 in the tapered concave groove 36 in the vicinity of the step portion 36b, and thus to contact together the tip end surface 15e of the base rod 15 and the base end surface 16a of the detachable rod 16. In this situation, by rotating the detachable rod 16 in the opposite direction to that which causes the sticking force to be reduced, the engagement pin 37 comes to engage with the step portion 36b, and since the further rotation of the detachable rod becomes impossible when this is done, due to this, it is possible to confirm that the tip end surface 15e of the base rod 15 and the base end surface 16a of the detachable rod 16 have come into contact.

According to this ejector device 7A, the magnetic rod fixing mechanism 14A comprises the first and second magnets 30, 31 that are provided both to the tip end portions of the base rods 15 and to the base end portions of the detachable rods 16, and since the sticking force reduction mechanism 35 is provided with which the sticking force may be reduced by rotation of the detachable rods 16 with respect to the base rods 15 from the state in which the base ends of the detachable rods 16 and the tip ends of the base rods 15 are stuck together, accordingly the construction of the magnetic rod fixing mechanism 14A is simplified, the base ends of the detachable rods 16 are reliably stuck to the tip ends of the base rods 15, and moreover it is possible to remove the detachable rods 16 from the base rods 15 in a simple manner by rotating them with respect to the base rods 15.

Embodiment 3

Figure 15:
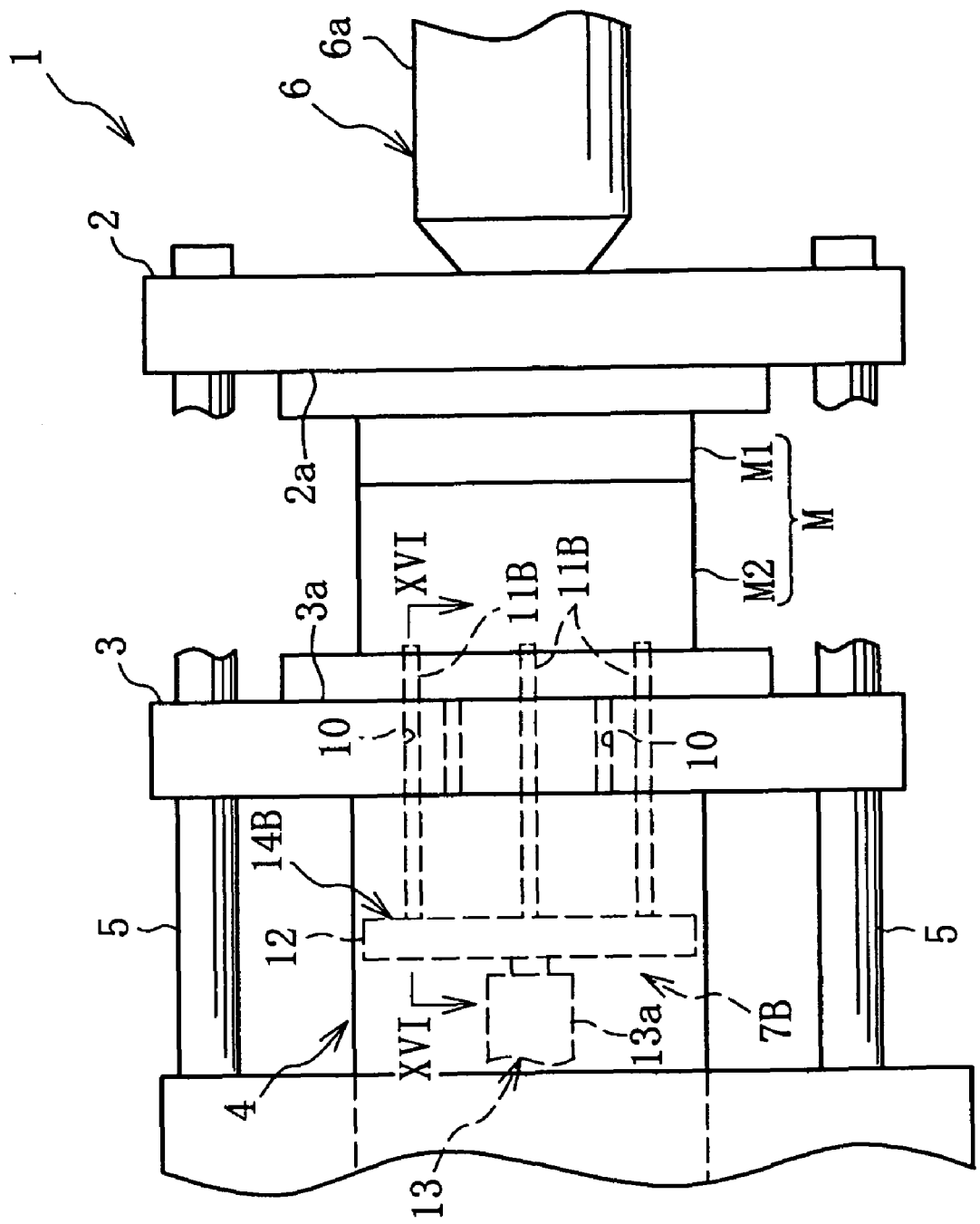
FIG. 15 is an elevation view of an ejector device and of a die of an injection molding machine according to Embodiment 3.
Figure 16:
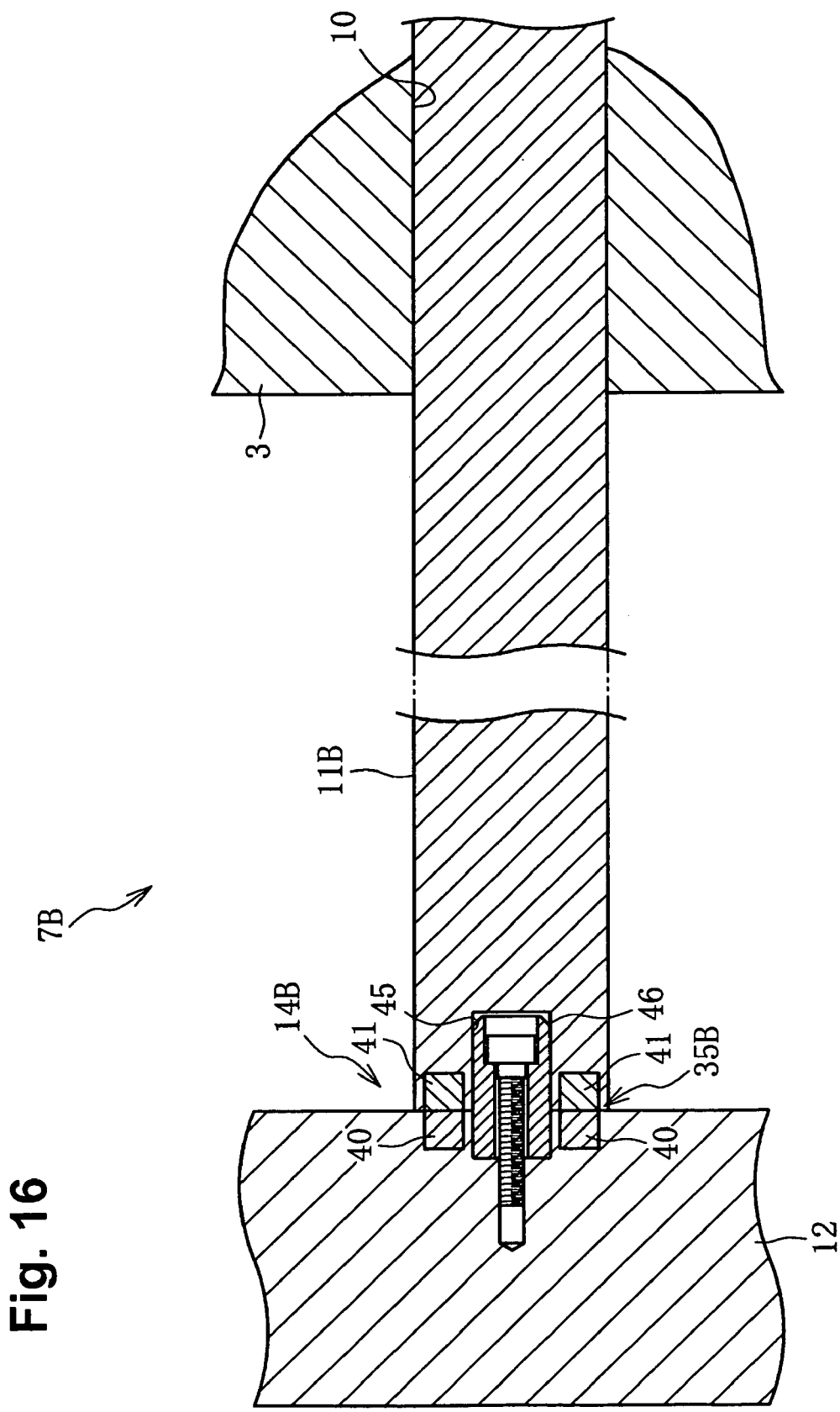
FIG. 16 is a sectional view along the line XVI-XVI of FIG. 15.

The ejector device 7B of Embodiment 3 is a version in which the ejector rods 11 and the magnetic rod fixing mechanism 14 of Embodiment 1 has been changed. As shown in FIGS. 15 and 16, each of the plurality of ejector rods 11B is made as one continuous unitary type ejector rod 11B from a magnetic material (for example, steel), and they are inserted into the plurality of rod insertion holes 10 so as to slide freely therein. It should be understood that the ejector plate 12 also is made from a magnetic material (for example, steel).

In order to make the ejector plate 12 generate magnetism for fixing these unitary type ejector rods 11B, this magnetic rod fixing mechanism 14B comprises a plurality of first magnets 40 (for example, four thereof) that are provided at a site on the ejector plate against which the unitary type ejector rod contacts and a plurality of second magnets 41 (for example, four thereof) that are provided at the base end portion of the unitary type ejector rod 11B; and a sticking force reduction mechanism 35B is provided, that reduces the sticking force when the unitary type ejector rod 11B is rotated from the state in which the unitary type ejector rod 11B and the ejector plate 12 are stuck together. The magnets 40 and 41 may be, for example, neodymium magnets.

In a manner which is fundamentally similar to the construction by which the plurality of first magnets 20 of Embodiment 1 are fixed at the tip end portion of the base rod 15, this plurality of first magnets 40 are fixed to the ejector plate 12, and in a manner which is fundamentally similar to the construction by which the plurality of second magnets 21 of Embodiment I are fixed at the base end portion of the detachable rod 16, the plurality of second magnets 41 are fixed at the base end portion of the unitary type ejector rod 11B.

Consequently, this magnetic rod fixing mechanism 14B has a structure such that it is possible to stick the base end portions of the unitary type ejector rods 11B to the ejector plate 12 by making the positions in the circumferential direction of the first and second magnets 40, 41 whose magnetic poles are opposite coincide with one another; and the sticking force reduction mechanism 35B has a structure such that it is possible to remove the unitary type ejector rods 11B from the ejector plate 12 by rotating the unitary type ejector rods 11B with respect to the ejector plate 12 from this state, and thus taking advantage of the repulsive force of the first and second magnets 40, 41 whose magnetic poles are the same.

Furthermore, the engagement holes 45 are provided at the central portions of the base end portions of the unitary type ejector rods 11B, and the engagement pins 46 that are made from a non-magnetic material (for example, stainless steel) are fixedly attached to the ejector plate 12 so as to project rightwards and so as to engage with the engagement holes 45. Thus, the engagement pins 46 are fixed to the ejector plate 12 with a construction that is fundamentally similar to the construction of Embodiment 1 by which the engagement pins 26 were fixed to the tip end portions of the base rods 15.

According to this ejector device 7B, when the dies on this injection molding machine 1 is to be exchanged, by removing from the ejector plate 12 the unitary type ejector rods 11B which, corresponding to the new die, are unnecessary, and by installing any newly required unitary type ejector rods 11B to the ejector plate, from the die fixing surface side 3a of the movable platen 3, it becomes possible to exchange the unitary type ejector rods 11B in a simple manner so that it is possible greatly to reduce the burden of the task of exchanging the ejector rods 11B. Moreover it is possible to reduce the load on the ejector drive mechanism 4, since it will suffice only to install to the ejector plate 12 those unitary type ejector rods 11B that are required.

Moreover, since the sticking force reduction mechanism 35B is provided that causes the sticking force to be reduced due to the unitary type ejector rods 11B being rotated from the state in which the unitary type ejector rods 11B and the ejector plate 12 are stuck together, accordingly, by rotating the unitary type ejector rods 11B, it is possible reliably to remove the unitary type ejector rods 11B from the ejector plate 12 in a simple manner from the die fixing surface side 3a of the movable platen 3.

Embodiment 4

Figure 17:
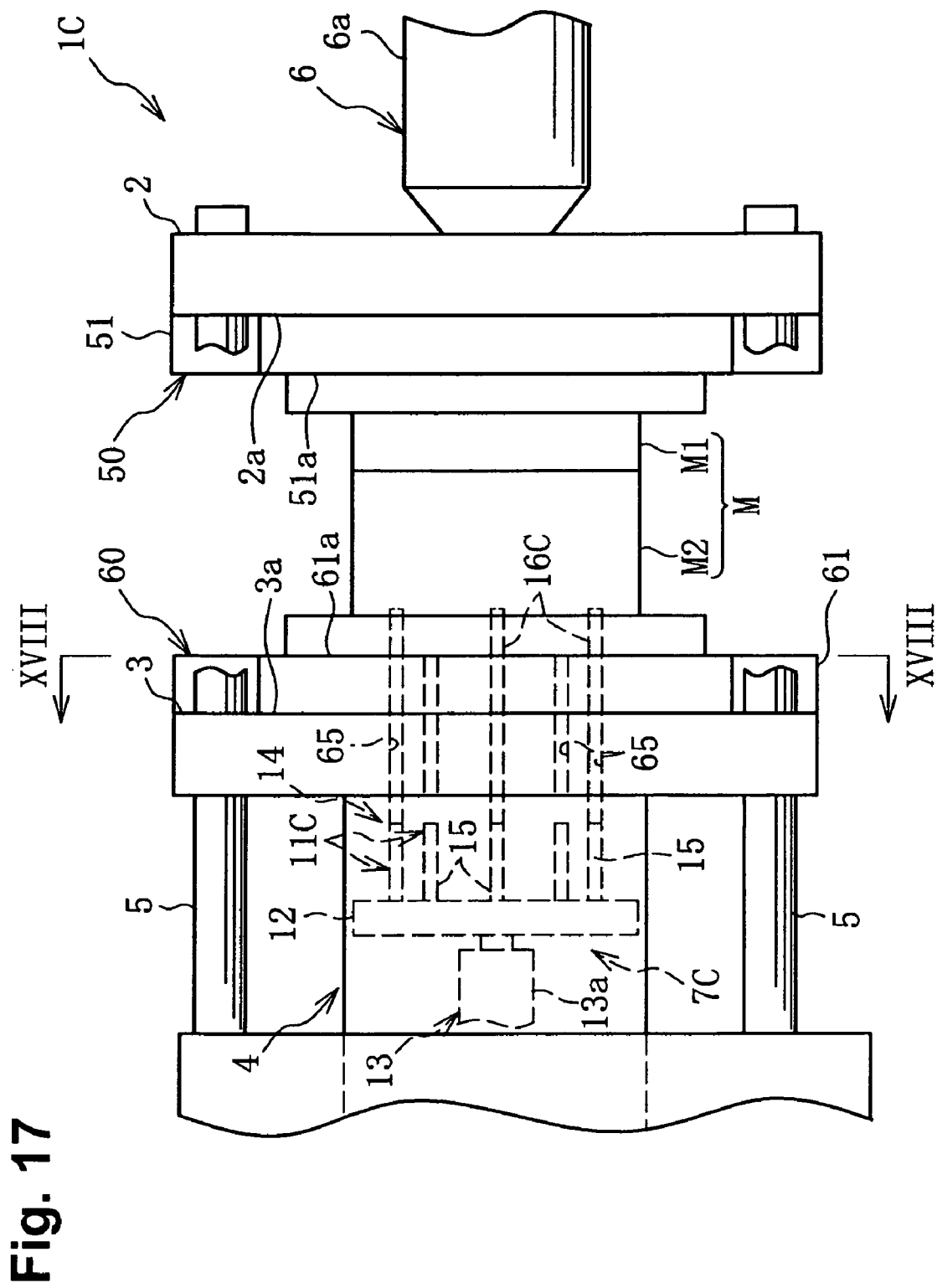
FIG. 17 is an elevation view of an injection molding machine and a set of dies of an ejector device according to Embodiment 4.
Figure 18:
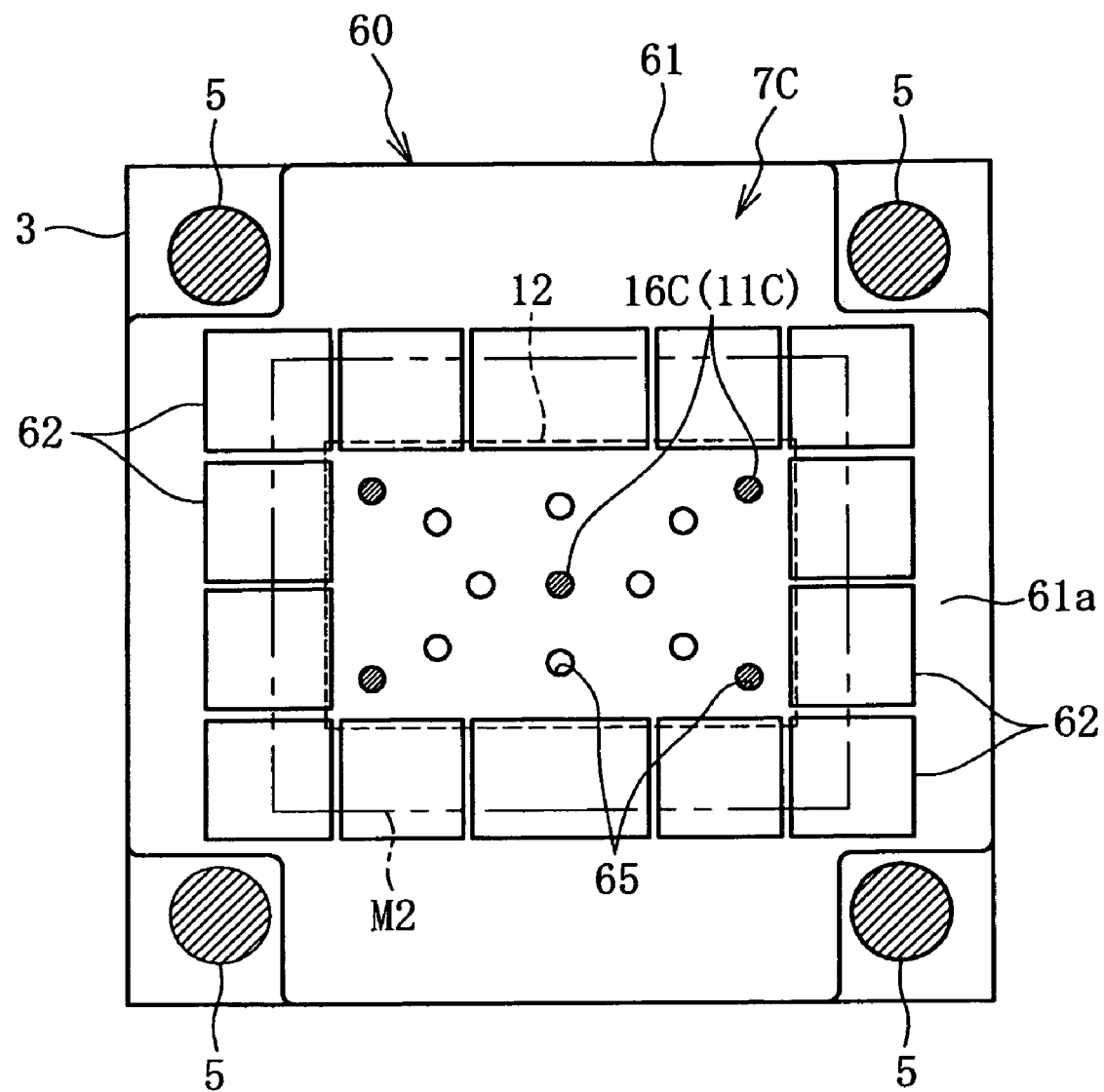
FIG. 18 is a sectional view along the line XVIII-XVIII of FIG. 17.

As shown in FIGS. 17 and 18, the injection molding machine 1C of Embodiment 4 comprises a magnetic die fixing device 50 that fixes the fixed die M1 to the fixed platen 2, and a magnetic die fixing device 60 that fixes the movable die M2 to the movable platen 3. The magnetic type fixing device 50 on the side of the fixed platen 2 comprises a clamp plate 51 that is fixed to the die fixing surface 2a of the fixed platen 2 and a plurality of magnet units (not shown in the figures) that are built into this clamp plate 51, and the fixed die M1 is stuck to the clamp plate 51 by the magnetism generated by this plurality of magnet units.

And the magnetic die fixing device 60 on the side of the movable platen 3 comprises a clamp plate 61 that is fixed to the die fixing surface 3a of the movable platen 3 and a plurality of magnet units 62 that are built into this clamp plate 61, and the movable die M2 is stuck to the clamp plate 61 by the magnetism generated by this plurality of magnet units 62. The fundamental structure of these magnetic die fixing devices 50, 60 is the same as that described in, for example, Japanese Laid-Open Patent Publication No. 2008-200927 whose applicant is the same as the applicant of the present application, and accordingly explanation thereof is omitted.

In this ejector device 7C, the ejector rods 11 of Embodiment 1 are changed, and also a plurality of plate side rod insertion holes 65 are provided in the clamp plate 61 formed so as to communicate respectively with the plurality of rod insertion holes 10. The plurality of magnet units 62 are provided so as not to interfere with this plurality of plate side rod insertion holes 65, for example in the arrangement shown in FIG. 18. And ejector rods 11C include a plurality of base rods 15 that are similar to those of Embodiment 1, and a plurality of detachable rods 16C whose lengths are longer than those of the detachable rods 16 of Embodiment 1.

Since according to this ejector device 7C the clamp plate 61 that is provided with the plurality of magnet units 62 that stick the movable die M2 by magnetism is fixed to the die fixing surface 3a of the movable platen 3, and since the plurality of plate side rod insertion holes 65 are formed in this clamp plate 61 so as to communicate respectively with the plurality of rod insertion holes 10, accordingly it is possible reliably to perform attachment of the movable die M2 to the movable platen 3, and removal thereof therefrom, and with this, similar advantages are obtained to the advantages provided by the ejector device 7 of Embodiment 1.

It should be understood that it would also be acceptable to arrange to vary Embodiments 1 through 4 in the following ways.

(1) In Embodiments 1, 2 and 4, the plurality of base rods 15 could be inserted into some of the plurality of rod insertion holes 10 so as to slide freely therein, with their base end portions being fixed to the ejector plate 12. In other words, the plurality of ejector rods 11 or 11B could be inserted into some of the plurality of rod insertion holes 10 so as to slide freely therein.

(2) In Embodiments 1, 3 and 4 it would be possible to provide, at the tip end portions of the base rods 15, not four of the first magnets 20, 40, but an even number thereof such as two or six or the like, and to form those first magnets 20, 40 in appropriate shapes and sizes, and moreover to arrange them at regular intervals in the circumferential direction with appropriate gaps between them, so that the magnetic poles of adjacent ones in the circumferential direction of the magnets 20, 40 were opposite right-to-left. In a similar manner, at the tip end portions of the detachable rods 16, 16C, there would be provided, not four of the second magnets 21, 41, but an even number thereof such as two or six or the like, and those second magnets 21, 41 would be formed in appropriate shapes and sizes, and moreover they would be arranged at regular intervals in the circumferential direction with appropriate gaps between them, so that the magnetic poles of adjacent ones in the circumferential direction of the magnets 21, 41 were opposite right-to-left.

(3) In Embodiment 2, the first magnets 30 provided at the tip end portions of the base rods 15, or the second magnets 31 provided at the base end portions of the detachable rods 16 or 16C, could be omitted. In other words, the magnetic fixing mechanism 14A could incorporate magnets 30 or 31 provided at only one of the tip end portions of the base rods 15 and the base end portions of the detachable rods 16.

(4) In Embodiments 3 and 4, the magnetic fixing mechanism 14A of Embodiment 2 could be employed, and the sticking force reduction mechanism 35 of Embodiment 2 could be employed. In this case, it would be acceptable to omit the first magnets 30 provided at the tip end portions of the base rods 15, or to omit the second magnets 31 provided at the base end portions of the detachable rods 16 or 16C.

(5) In Embodiments 1 through 4, with regard to the ejector drive mechanism 13, as its drive source, apart from a hydraulic cylinder, it would also be possible to employ a drive motor; and moreover it would be possible to employ various types of ejector drive mechanism with such an actuator, such as driving the ejector plate 12 via a toggle mechanism or a ball screw mechanism or the like.

(6) Apart from the above, for a person skilled in the art, it is possible to implement various changes to the above embodiments in additional ways without deviating from the gist of the present invention, and the present invention should also be considered as including this type of variant embodiment.

DESCRIPTION OF NUMERALS

M2: movable die
1: injection molding machine
3: movable platen
3a: die fixing surface
7, 7A, 7B, 7C: ejector devices
10: rod insertion hole
11, 11C: ejector rods
11B: unitary type ejector rod
12: ejector plate
13: ejector drive mechanism
14, 14A, 14B: magnetic rod fixing mechanisms
15: base rod
16, 16C: detachable rods
20, 30, 40: first magnets
21, 31, 41: second magnets
25, 45: engagement holes
26, 46: engagement pins
35, 35B: sticking force reduction mechanism
61: clamp plate
62: magnet unit
65: plate side rod insertion hole

The invention claimed is:

1. An ejector device of an injection molding machine that ejects a molded product from a die fixed to a platen of the injection molding machine, the ejector device comprising:
   a plurality of rod insertion holes formed so as to pierce through the platen;
   a plurality of ejector rods that are inserted into all or some of the plurality of rod insertion holes so as to slide freely therein;
   an ejector plate that is disposed at the rear side of the platen;
   an ejector driver that drives the ejector plate with respect to the platen in directions to approach it towards and to withdraw it from the platen; and
   a magnetic rod fixing structure that generates magnetism for removably fixing each one of the plurality of ejector rods to the ejector plate, and is capable of annulling said magnetism by rotating said each one of the plurality of ejector rods around an axis of said each one of the plurality of ejector rods.

2. An ejector device of an injection molding machine according to claim 1,
   wherein the plurality of ejector rods comprises a plurality of base rods that are inserted into all or some of the plurality of rod insertion holes so as to slide freely therein and whose base end portions are fixed to the ejector plate, and a plurality of detachable rods that can be fitted to and removed from at least some of these base rods; and
   wherein the magnetic rod fixing structure sticks the base end portions of the detachable rods to the tip end portions of the base rods with magnetism.

3. An ejector device of an injection molding machine according to claim 2, wherein the base end portions to the base rods are engaged to the ejector plate by screw engagement.

4. An ejector device of an injection molding machine according to claim 2, wherein a clamp plate including a plurality of magnet units that stick the die with magnetism is fixed to a die fixing surface of the platen, and a plurality of plate side rod insertion holes are formed in this clamp plate and communicate respectively with the plurality of rod insertion holes.

5. An ejector device of an injection molding machine according to claim 2, wherein when the ejector rods are projected in their eject positions, the tip end portions of the base rods are positioned more towards the platen side than the die.

6. An ejector device of an injection molding machine according to claim 2, wherein the magnetic rod fixing structure comprises a plurality of first magnets provided on the tip end portions of the base rods at regular intervals around the circumferential direction and arranged so that the magnetic poles of adjacent magnets in the circumferential direction are opposite, and a plurality of second magnets provided on the base end portions of the detachable rods at regular intervals in the circumferential direction and arranged so that the magnetic poles of adjacent magnets in the circumferential direction are opposite.

7. An ejector device of an injection molding machine according to claim 6, wherein the magnetic rod fixing structure sticks the base end portions of the detachable rods to the tip end portions of the base rods by the positions in the circumferential direction of ones of the first and the second magnets whose magnetic poles are opposite being made to match one another, and is made so that the detachable rods can be removed from the base rods by rotating the detachable rods with respect to the base rods from this state, thus taking advantage of the repulsive force of ones of the first and the second magnets whose magnetic poles are the same.

8. An ejector device of an injection molding machine according to claim 2,
wherein the magnetic rod fixing structure comprises magnets provided to at least one of the tip end portions of the base rods and the base end portions of the detachable rods; and
wherein a sticking force reduction means is provided that decreases the sticking force by the detachable rods being rotated with respect to the base rods from the state in which the base end portions of the detachable rods and the tip end portions of the base rods are stuck together.

9. An ejector device of an injection molding machine according to claim 6, wherein the provision of engagement holes formed at central portions of one of the tip end portions of the base rods and the base end portions of the detachable rods, and engagement pins made from non-magnetic material and attached to the central portions of the other of the tip end portions of the base rods and the base end portions of the detachable rods, so as to project and so as to engage with these engagement holes.

10. An ejector device of an injection molding machine according to claim 1,
wherein the ejector rods are made as single member continuous unitary type ejector rods; and
wherein the magnetic rod fixing structure comprises magnets for generating magnetism for fixing the unitary type ejector rods to the ejector plate, provided to at least one of the base end portions of the unitary type ejector rods and the sites on this ejector plate where the unitary type ejector rods contact against it.

11. An ejector device of an injection molding machine according to claim 10, further comprising a sticking force reduction device that decreases the sticking force by the unitary type ejector rods being rotated from the state in which the unitary type ejector rods and the ejector plate are stuck together.

* * * * *